(12) United States Patent
Schmidt

(10) Patent No.: US 6,758,211 B1
(45) Date of Patent: Jul. 6, 2004

(54) TRANSPARENT THERMAL INSULATION DEVICE

(75) Inventor: Christoph Schmidt, Gunzenhausen (DE)

(73) Assignee: Glaswerke Arnold GmbH & Co. KG (DE)

( * ) Notice: Subject to any disclaimer, the term of this patent is extended or adjusted under 35 U.S.C. 154(b) by 0 days.

(21) Appl. No.: 10/030,136

(22) PCT Filed: Jul. 27, 1999

(86) PCT No.: PCT/EP99/05380

§ 371 (c)(1),
(2), (4) Date: Jan. 28, 2002

(87) PCT Pub. No.: WO01/07845

PCT Pub. Date: Feb. 1, 2001

(51) Int. Cl.[7] ............................... F24J 2/50; F24J 2/36; F24J 2/46
(52) U.S. Cl. ..................... 126/652; 126/623; 126/709
(58) Field of Search ............................ 126/652, 608, 126/623, 678, 709, 713; 165/48.2, 49

(56) References Cited

U.S. PATENT DOCUMENTS

| | | | | |
|---|---|---|---|---|
| 4,300,535 A | * | 11/1981 | Munroe | 126/666 |
| 4,312,915 A | * | 1/1982 | Fan | 428/323 |
| 4,483,325 A | * | 11/1984 | Siemiller | 126/652 |
| 5,005,557 A | * | 4/1991 | Bachli | 126/572 |
| 5,009,218 A | * | 4/1991 | Bachli | 126/714 |
| 5,251,610 A | * | 10/1993 | Lai | 126/608 |
| 5,313,933 A | * | 5/1994 | Gocze | 126/674 |
| 5,787,653 A | * | 8/1998 | Sakai et al. | 52/173.3 |

FOREIGN PATENT DOCUMENTS

| | | |
|---|---|---|
| CH | 687549 A5 | 12/1996 |
| DE | 9306519.1 | 7/1993 |
| DE | 9307307.0 | 7/1993 |
| DE | 19642511 C1 | 1/1998 |
| WO | WO95/10740 | 4/1995 |

OTHER PUBLICATIONS

English translation of CH 687549.*
English translation of G 93 07 307.0.*
English translation of G 93 06 519.1.*

* cited by examiner

Primary Examiner—Alfred Basichas
(74) Attorney, Agent, or Firm—Bacon & Thomas, PLLC; Felix J. D'Ambrosio

(57) ABSTRACT

A transparent thermal insulation arrangement for heating buildings with solar energy includes a glass plate, and absorber and an edge bond between the glass plate and the absorber. The absorber has an absorber plate which is inherently rigid and is assembled with the glass plate by the edge bond. An intermediate space is formed between the glass plate and the absorber plate and is filled with an inert gas. In addition, a space is formed between the absorber plate and the wall of the building which may be filled with air.

16 Claims, 3 Drawing Sheets

TRANSPARENT THERMAL INSULATION DEVICE

FIELD OF THE INVENTION

The present invention relates to a transparent thermal insulation arrangement for the solar heating of buildings with a glass plate and an absorber arranged at a distance to the glass plate via an edge bond.

BACKGROUND OF THE INVENTION

While conventional opaque building insulation in an exterior wall can only reduce heat loss from a building, transparent thermal insulation systems can utilize solar energy for the heating of buildings and provide net het gain in the course of the heating period. The term "transparent thermal insulation (≡ hereinafter TTI)" is defined as materials which possess thermal insulation properties while they are transparent for solar radiation. Solar radiation penetrates the system and reaches the wall where it is converted into heat which is conducted through the wall into the room behind. Only a small amount of heat flows back outside. For the conversion of solar radiation into heat, it is customary to apply a radiation-absorbing layer to the wall in the form of plaster or paint.

A TTI element described by J. Geisler in the periodical "Sonnenenergie" ["Solar Energy"], 4/95 (published by Verlag Solar Promotion GmbH) consists of a frame filled with drying agents into which very thinly-walled glass tubes are inserted. The glass tubes are fixed in a bond resembling insulation glass, between two highly transparent glass plates. This structure allows a large amount of the incident solar energy to pass while providing a high degree of thermal insulation against the heat stored in the exterior wall. The presence of drying agents in the insulation glass bond plus the fact that the glass tubes do not absorb any moisture means that the function of the element is not adversely affected over time through condensation in the interior of the element.

In this construction known in prior art, a gas-filled intermediate space is provided between the TTI element and the absorbent layer on the exterior wall of the building. Since gas exchange takes place between this intermediate space and the ambient air, the space is always filled with air. The intermediate space can also serve as ventilation if little or no heating effect is desired. However, condensation can form in this air space, and in particular on the absorbent layer, in case of temperature fluctuations. Dust can also settle on the absorbent layer, which over time will adversely affect the light-absorbing, solar-energy absorbing and infrared-reflecting properties of this layer. This layer must therefore be resistant to such effects. It must also be easy for contractors to apply it to several backgrounds (masonry, plaster). Normally, dark plaster or paint coats are therefore used. These have a good absorption coefficient (a to 95%), but a relatively high emission coefficient (>50%).

A transparent thermal insulation arrangement of the type mentioned above is described in DE 196 42 511 C1, from which a double-plated insulation glazing in an aluminum frame is known. In it, a black absorber film is applied to the surface facing the intermediate space between the two plates of the inner glass plate, and an insulation glazing is fastened to the exterior wall with mortar and a silicon layer, without an air space.

A disadvantage of this construction is that an additional glass plate must be provided and that this glass plate must be coated with the film-like absorber. This is time-consuming and costly. Furthermore, the application of such a TTI arrangement to an exterior wall constitutes a rather complicated and difficult process, which has the effect that once the TTI arrangement has been fastened, it cannot be removed from the wall without destroying the arrangement.

SUMMARY OF THE INVENTION

It is the object of the invention to provide a TTI arrangement which does not have the disadvantages of these prior-art system, and which in particular can be installed and dismantled in a standard work process.

This object is achieved by means of an arrangement of the above kind where the absorber consists of an inherently rigid inner absorber plate which is held together with the glass plate by an insulation-glass edge, with an intermediate space filled with an inert gas, and with an air space provided between the absorber plate and the building wall.

The arrangement according to the invention is provided with an insulation-glass edge bond between a glass plate and an interior inherently rigid or stable absorber plate. This means that the glass plate and the absorber plate are held together or bonded together by means of a spacer containing a drying agent, and that no condensation can occur in the space between the two plates. Neither can dust or other contaminants enter the inside and affect the absorber surface of the absorber plate. Since the absorbent layer is hermetically sealed and thus protected against the weather and contamination, very efficient layers can be used which, however, can also be very sensitive. The installation of the inherently rigid absorber and the glass plate is very simple and quick.

According to a preferred embodiment of the thermal insulation plate according to the invention, another glass plate is provided outside, whereby this additional plate is held together with an insulation-glass edge bond. Due to the presence of a drying agent in the outer edge bond, it is in turn ensured that no condensation can occur in the outer intermediate space either.

The intermediate space between the outer and middle glass plates can be filled with parallel layers of glass tubes, plastic honeycomb or tubular structures, but also with aerogel or other materials to suppress convection and attenuate infrared radiation, whereby preferably, an air gap is left in the intermediate space beside the honeycombs or tubes. The intermediate space between the outer and middle glass plates can also be filled with an inert gas such as krypton.

BRIEF DESCRIPTION OF THE DRAWINGS

Further details of the invention are described and explained below with reference to the embodiments shown in the drawings, where.

DESCRIPTION OF THE PREFERRED EMBODIMENTS

Figure 1:
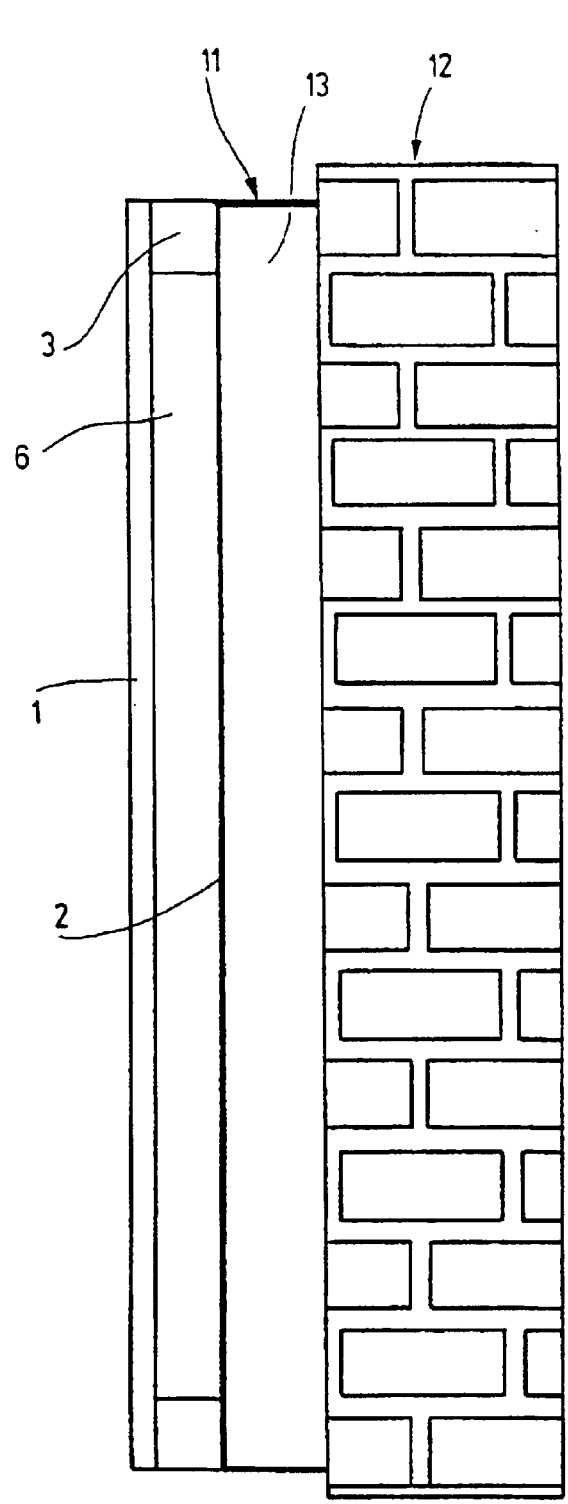
FIG. 1 shows a schematic cross section of a first embodiment.

FIG. 1 shows a TTI element 10, which comprises a glass plate 1 made of single-plate safety glass, which can be 5 mm thick, for example. The plate 1 forms the outside of the TTI element 10. The inside of the TTI element 10 lying opposite the building wall is formed of an inherently rigid absorber plate 2, which, in the embodiment shown in FIG. 1, consists of a sheet-metal absorber plate. The edge bond 3 between the glass plate 1 and the absorber plate 2 forms an intermediate space 6 that is filled with drying agents of the type known in insulation glass technology. The distance between the glass plate 1 and the absorber plate 2 is usually 5–20 mm, depending on the gas filling, in the case of krypton typically 11 mm. The TTI element 10 is provided with a support bracket 11 that is mounted on the unplastered solid masonry wall 12, leaving a ventilation space 13. The TTI element 10 weighs approximately 10 kg per square meter. Thanks to this low weight, frames known in prior art which can swing open, can be used, offering a possibility of protection against overheating, for example by thermostatically regulated tilting of (not necessarily all) the elements away from the solid masonry wall 12 (see FIG. 4). Suitable thermostatically self-regulating arrangements are used, for example, for the automatic ventilation of greenhouses.

Figure 2:
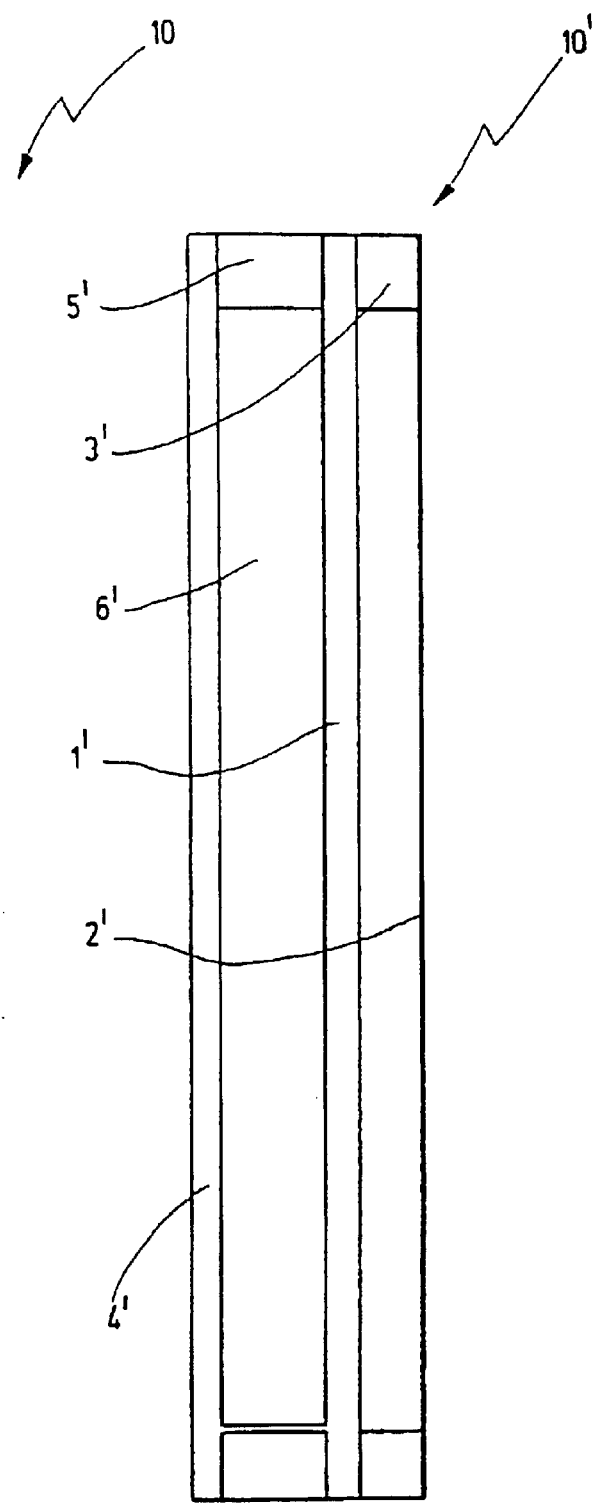
FIG. 2 shows a schematic cross section of a second embodiment, but without a building wall.

According to FIG. 2, the TTI element 10' of another embodiment is provided with a glass plate 1' and an inherently rigid absorber plate 2', which are held apart by spacer 3'. The intermediate space, which can be 11 mm wide, for example, can be filled with an inert gas such as krypton. Toward the outside, i.e. ahead of the first glass plate 1', is a second glass plate 4' consisting, for example, of 5 mm single-plate safety glass which is separated from the first glass plate 1' by a spacer 5' of the kind used in insulation glass technology and is filled with a drying agent. A further intermediate space 6' between the first and second glass plates 1' and 4' is also preferably filled with an inert gas such as krypton. The outside of the first glass plate 1' may be provided with an emission-reducing coating.

According to a version of this embodiment not shown in FIG. 2, the outer intermediate space 6' may also contain an additional aerogel filling and be provided with convection-suppressing structures such as packs of small plastic tubes. Furthermore, according to another version, a transparent plate filled with aerogel in the form of a so-called double web plate can be provided instead of the glass plate 1'.

Figure 3:
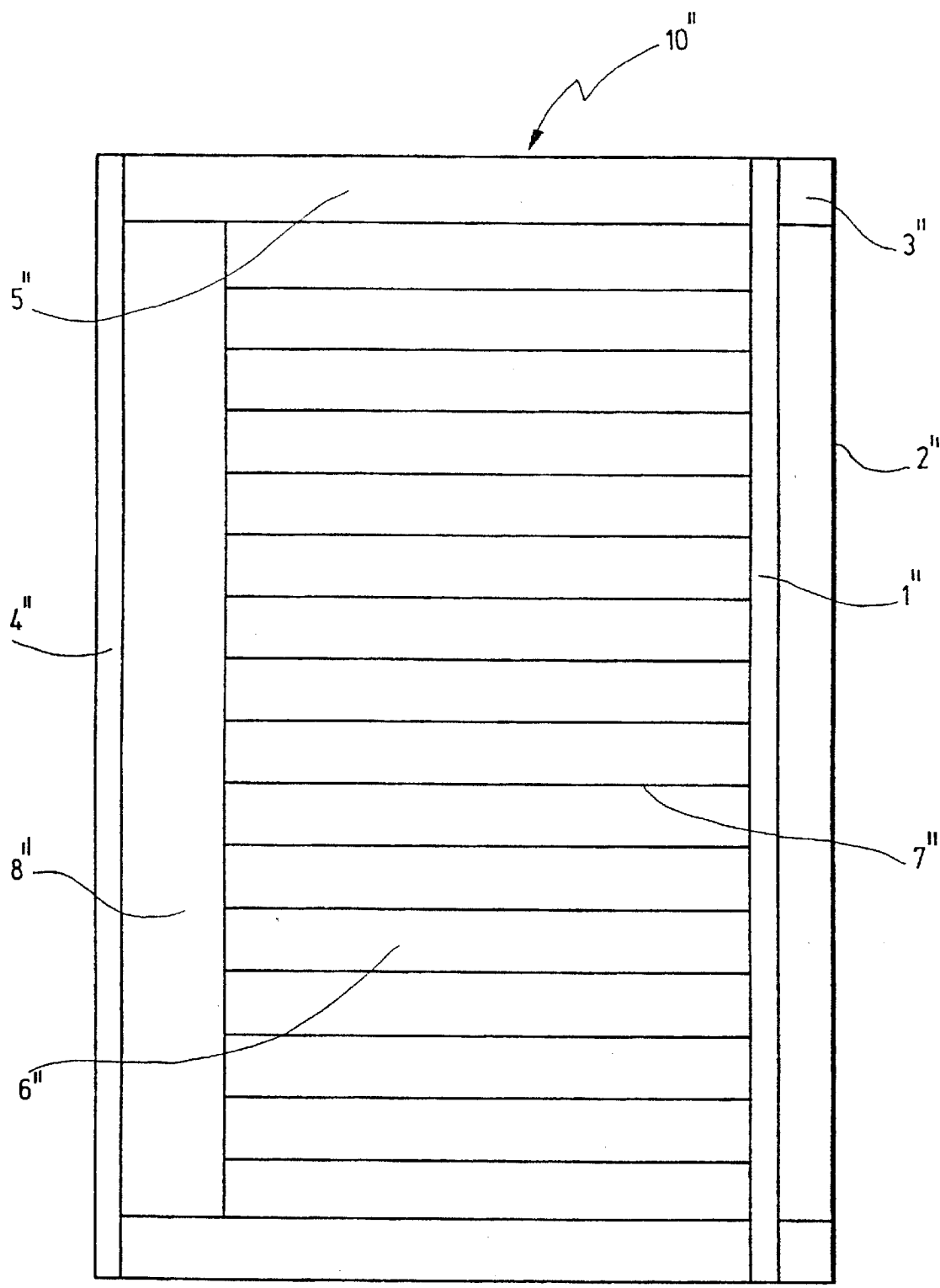
FIG. 3 shows a schematic cross section of a third embodiment, also without a building wall.

According to another embodiment of the TTI element 10" according to the invention, which is shown in schematic cross section in FIG. 3, an insulation-glass edge bond 3", 5" is created, with an outer single-plate security glass 4", a middle single-plate security glass 1", and an inner inherently rigid absorber plate 2". The intermediate space 6" between the outer and the middle glass plates is about 95 mm wide. This intermediate space contains a glass tube pack 7". The small glass tubes 9" are very thin-walled glass tubes measuring about 80 mm in length with a diameter of 10 mm. The small tubes 9" can also have any other length, which would change the intermediate space 6" accordingly. The optical properties of the small glass tubes 9" allow more than 80% of the incident light-generating solar energy to penetrate to the absorber plate 2". Beside the glass tubes 9", an air gap 8" with a width of approximately 15 mm is left open in the same intermediate space. It is particularly advantageous to use the small glass tubes 9" because they cannot absorb water, are statically self-supporting, geometrically exact in construction, temperature- and UV-resistant, and inflammable.

Figure 4:
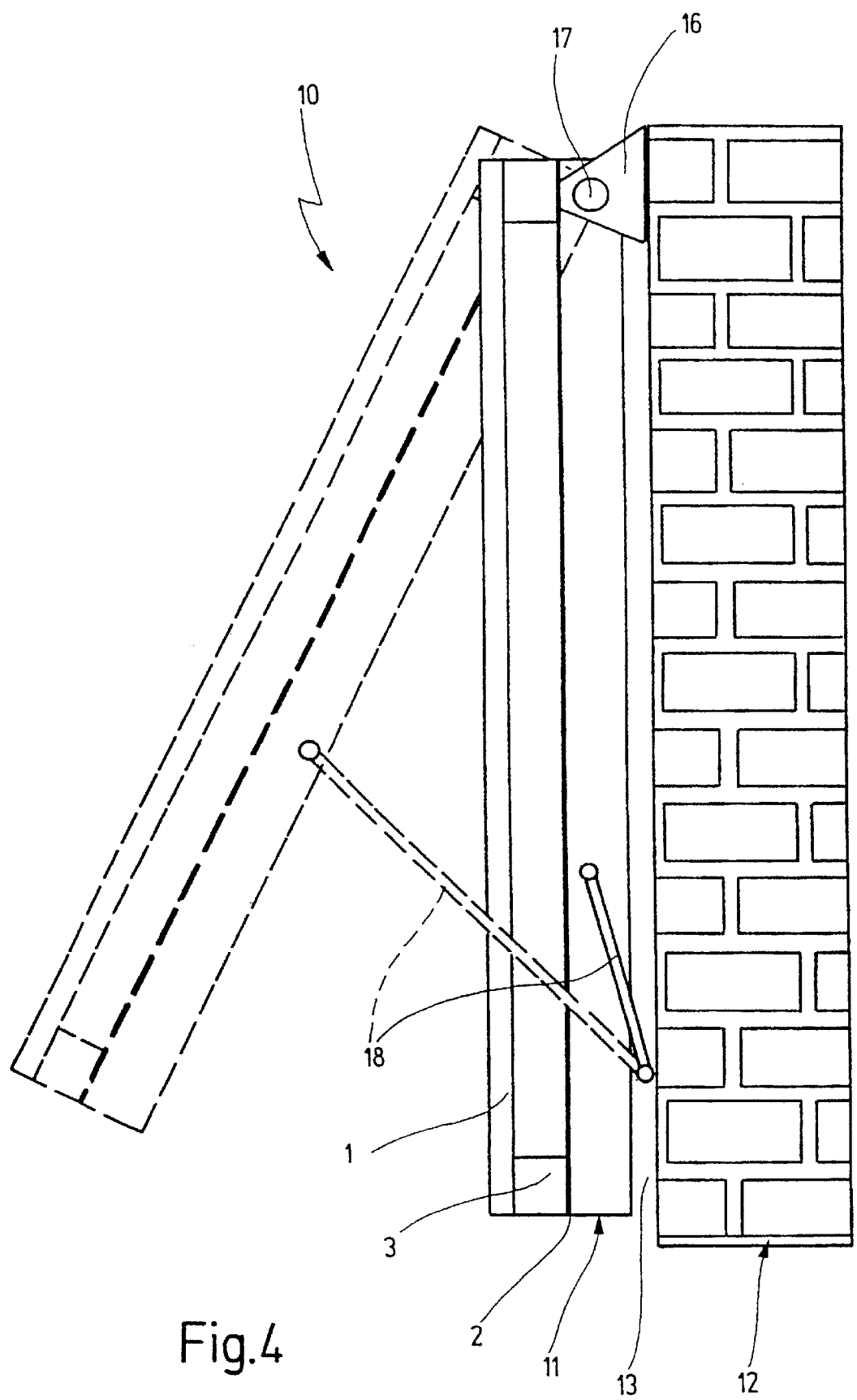
FIG. 4 shows a schematic cross section of a fourth embodiment.

In the embodiment shown in FIG. 4, the TTI element 10 according to FIG. 1 is tiltably mounted to the solid masonry wall 12. For this purpose, the upper end or an upper region of the solid masonry wall 12 is provided with a vertically extending bracket 16 on which the upper end of the vertical part of the rear support bracket 11 is held about a swivel axis 17. For the automatic or semi-automatic tilting of the TTI element 10 from the solid masonry wall 12, a lifting cylinder 18 is provided whose one end is linked to a corresponding section of the support bracket 11 and whose other end is movably supported on the solid masonry wall 12 in a manner not shown in detail. FIG. 4 shows the final retracted parallel position as well as the extended position, but any intermediate positions are possible as well.

It goes without saying that according to FIG. 4, the TTI element 10 can also be arranged so that it can be tilted from the top down instead of from the bottom up. It goes without saying as well that the TTI element 10' and/or the TTI element 10" can also be arranged so that it can be tilted away from a wall 12 as shown in FIG. 4.

The inventive characteristics of the four above-described embodiments 10, 10' and 10" are shown below in Table 1.

TABLE 1

|  | Embodiment | | |
| --- | --- | --- | --- |
|  | 1 | 2 | 3 |
| Intermediate spaces | 1 × inert gas | 1 × inert gas 5–20 mm + 1 × inert gas 5–20 mm | 1 × inert gas 5–20 mm + 1 × small pipes 80 mm |
| g value (DIN 67507) | c. 90% | c. 80% | c. 80% |
| k value | 0.7–1.2 $W/m^2$ K | 0.7–1.2 $W/m^2$ K | 0.6–0.7 $W/m^2$ K |

Inert gases: argon, krypton or xenon

Instead of filling the intermediate space with an inert gas, it can also be filled with air. In that case, the intermediate space in question can be provided with a conventional pressure equalizer against the outside air.

The embodiment shown in FIG. 1, in spite of low construction costs and a reduced weight, still has k values of 0.7 to 1.0 $W/m^2$ K. The embodiments shown in FIG. 2 and 3 clearly improve the k value. Yet the TTI element 10' in FIG. 2 is practically half as thick as any TTI element known in prior art. In particular, however, it is <50 mm, which means that such an element can still be integrated into commercially available frame constructions. The total thickness of the TTI element 10" shown in FIG. 3 is only slightly greater than that of a TTI element known in prior art (c. 110 mm instead of c. 100 mm).

All the above described embodiments have the following advantages:

The absorber is hermetically sealed and thus protected against the weather and contamination, which means that very efficiently absorbent layers can be used. The selective properties of the absorber are retained permanently. The same applies to its absorptive properties in the area of solar radiation. It is also possible to choose the colour on the outside of the selective layer.

The absorber is integrated in the TTI element 10, 10', 10". For that reason, a higher degree of prefabrication can be achieved, and the TTI element 10, 10', 10" can be applied to a rough, unplastered building wall 12. Therefore, the process of plastering or painting on the construction site is unnecessary.

The TTI element 10, 10', 10" can be ventilated, for example for cooling purposes in the summer, without running the risk of contamination and the resulting reduction in transmission.

Heat transmission from the absorber plate 2, 2', 2" to the solid masonry wall 12 behind it no longer takes place via heat conduction, as is the case when the absorber plaster or the absorber coating is in contact with the solid masonry wall, but via radiation, gas convection and gas conduction. The kind of heat conduction can be chosen to take the form of a backing on the sheet-metal or glass absorber plate between c. 2 to 8 W/m² K. If, for example, a copper absorber plate is chosen, heat conduction from the absorber to the wall would be 2 W/m²K if the backing is bare copper, and up to 8 W/m²K if the backing is painted copper. With a backing of bare glass, heat transfer would be 8 W/m²K.

It goes without saying that the ventilation, which serves as protection against overheating, can also be used for heating.

According to embodiments not shown, the absorber plate 2, 2', 2" can be provided with tubes carrying flowing water, to form a facade collector or absorber. Furthermore, the front, i.e. exterior glass cover can be designed as or provided with a prism plate to achieve protection against seasonal overheating.

According to another embodiment not shown, the air space between the absorber and the transparent cover can also be wider than 20 mm. Particularly with the arrangement according to FIG. 1, it can be, for example, 2×20 mm=40 mm. In that case, lamellar shutters can be integrated in the SZR (Solar Cell Reflector), the vanes of which consist of highly polished aluminum and can be adjusted so that by day they can direct an optimum of solar energy to the absorber, due to their light-reflecting properties, while they can be closed completely at night. In that case, they act as IR reflectors, which means that the k value of the arrangement is reduced correspondingly.

Advantageously, the small glass tubes can have a ring-shaped, circular or honeycomb cross section or be of any other shape. Instead of glass, any suitable plastic material can also be used for the small tubes.

All embodiments, instead of attaching them to a solid masonry wall with an intermediate air gap, can also be provided with a rear thermal insulation (such as PU foam) and installed in panel form into an appropriate facade construction. In that case, the thermal insulation is applied directly behind the sheet-metal absorber plate.

What is claimed is:

1. A transparent thermal insulation arrangement for the solar heating of buildings, including: a glass plate; an edge bond; and an absorber arranged at a distance to said glass plate via said edge bond, wherein: the absorber consists of an inherently rigid inner absorber plate which is held together with said glass plate by said edge bond; an intermediate space is provided between said glass plate and said absorber filled with an inert gas; an air space is provided between said absorber plate and a building wall; and the side of said absorber plate facing the building wall is provided with a layer for adjusting the heat transfer.

2. The transparent thermal insulation arrangement according to claim 1, wherein: said absorber plate consists of a sheet-metal absorber plate whose side facing said intermediate space is coated with a light-absorbing material.

3. The transparent thermal insulation arrangement according to claim 1, wherein: said glass plate forms a first glass plate; ahead of said first glass plate, and on the outside thereof, a second glass plate is arranged; and said first and second glass plates are held together by a second edge bond.

4. The transparent thermal insulation arrangement according to claim 3, wherein: said first and second glass plates define a further intermediate space between them; and said further intermediate space is filled with an inert gas.

5. The transparent thermal insulation arrangement according to claim 4, wherein: said first glass plate is coated.

6. The transparent thermal insulation arrangement according to claim 4, wherein: said further intermediate space is filled with layered horizontally arranged small tubes made of glass or plastic.

7. The transparent thermal insulation arrangement according to claim 6, wherein: said further intermediate space is also provided with an air gap.

8. The transparent thermal insulation arrangement according to claim 6, wherein: said small tubes have one of: a circular and honeycomb cross-section.

9. The transparent thermal insulation arrangement according to claim 1, wherein: said absorber plate, said glass plate and said edge bond are held in one of: a frame and a rear support bracket, and are connected to the building wall only via said frame or support bracket.

10. The transparent thermal insulation arrangement according to claim 3, wherein: said absorber plate, said glass plates and said edge bonds are held in one of: a frame and a rear support bracket, and are connected to the building wall only via said frame or support bracket.

11. The transparent thermal insulation arrangement according to claim 1, further including: means for tiltably attaching the arrangement to the building wall.

12. The transparent thermal insulation arrangement according to claim 1, wherein: said absorber plate is provided with tubes filled with flowing water.

13. The transparent thermal insulation arrangement according to claim 1, wherein: said glass plate comprises a prism plate.

14. The transparent thermal insulation arrangement according to claim 3, wherein: said first glass plate comprises a prism plate.

15. The transparent thermal insulation arrangement according to claim 1, wherein: the arrangement is used as a wall element insulation.

16. The transparent thermal insulation arrangement according to claim 1, wherein: one of: a lamellar shutter and blinds are situated between said glass plate and said absorber plate.

* * * * *